(12) United States Patent
Hirota

(10) Patent No.: US 6,188,977 B1
(45) Date of Patent: Feb. 13, 2001

(54) NATURAL LANGUAGE PROCESSING APPARATUS AND METHOD FOR CONVERTING WORD NOTATION GRAMMAR DESCRIPTION DATA

(75) Inventor: Makoto Hirota, Tokyo (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/219,723

(22) Filed: Dec. 23, 1998

(30) Foreign Application Priority Data

Dec. 26, 1997 (JP) .................................................. 9-366744
Dec. 22, 1998 (JP) ................................................ 10-364759

(51) Int. Cl.⁷ .................................................. G06F 17/27
(52) U.S. Cl. .................................................. 704/9
(58) Field of Search .......................... 704/1, 9, 10, 258, 704/260; 707/530, 531, 532, 533

(56) References Cited

U.S. PATENT DOCUMENTS

| | | | |
|---|---|---|---|
| 4,829,423 | * 5/1989 | Tennant et al. | 704/9 |
| 4,914,704 | * 4/1990 | Cole et al. | 704/9 |
| 5,225,981 | * 7/1993 | Yokogawa | 704/9 |
| 5,371,807 | * 12/1994 | Register et al. | 704/9 |
| 5,781,884 | * 7/1998 | Pereira et al. | 704/260 |
| 5,848,389 | * 10/1999 | Asano et al. | 704/239 |
| 5,890,117 | * 3/1999 | Silverman | 704/260 |
| 5,970,449 | * 10/1999 | Alleva et al. | 704/235 |

FOREIGN PATENT DOCUMENTS

07021174 * 1/1995 (JP) .................................. G06F/17/22

* cited by examiner

Primary Examiner—Forester W. Isen
Assistant Examiner—Patrick N. Edouard
(74) Attorney, Agent, or Firm—Fitzpatrick, Cella, Harper & Scinto

(57) ABSTRACT

A natural language processing apparatus converts word notation grammar description data, which explain the rules for the construction of words that belong to categories having a variety of notations, such as the names of product models, onomatopoeic words and numerical expressions, into word notation context free grammar data that are expressed in the form of an expanded context free grammar. In the analysis processing according to the context free grammar, a character string that satisfies the construction rule for a product model name, an onomatopoeic word or a numerical expression is extracted as a word from the natural language sentence that is an input in accordance with the word notation context free grammar data. Further, in accordance with a category that corresponds to the construction rule, the part of speech and the pronunciation of the word are determined by referring to a dictionary in which word information for each category is explained. Finally, the natural language sentence that is input is rendered vocally.

17 Claims, 8 Drawing Sheets

| [NOTATION] | COLOR |
| [VARIANT NOTATION] | COLOUR |
| [A PART OF SPEECH] | NOUN |
| [WORD INTERPRETATION SENTENCE] | THE SENSATION PRODUCED BY LIGHT OF DIFFERENT WAVELENGTHS |
| [NOTATION] | ANALYZE |
| [VARIANT NOTATION] | ANALYSE |
| [A PART OF SPEECH] | VERB |
| [WORD INTERPRETATION SENTENCE] | TO EXAMINE AND INTERPRET |

FIG. 4

| | |
|---|---|
| [NOTATION] | <INTEGER> |
| [A PART OF SPEECH] | NUMERAL |
| [SUBDIVISION] | INTEGER |
| [PRONUNCIATION] | INTEGER READING |
| | |
| [NOTATION] | <FRACTION> |
| [A PART OF SPEECH] | NUMERAL |
| [SUBDIVISION] | FRACTION |
| [PRONUNCIATION] | FRACTION READING |
| | |
| [NOTATION] | <DATE> |
| [A PART OF SPEECH] | NUMERAL |
| [SUBDIVISION] | DATE |
| [PRONUNCIATION] | DATE READING |
| | |
| [NOTATION] | <SLEEPING SOUND> |
| [A PART OF SPEECH] | ADVERB |
| [WORD INTERPRETATION SENTENCE] | ONOMATOPOEIA OR MIMETIC WORD FOR STANDING FOR SLEEPING SOUND |
| [PRONUNCIATION] | ALPHABET READING |
| | |
| [NOTATION] | <NL_PRODUCT> |
| [A PART OF SPEECH] | NOUN |
| [WORD INTERPRETATION SENTENCE] | MODEL NAME OF NATURAL LANGUAGE PROCESSING PRODUCT BY C COMPANY |
| [PRONUNCIATION] | ALPHABET READING, READING FIGURES IN MONOTONE |

FIG. 5

```
# "zzzzz"
<SLEEPING SOUND> → <Z>{3,};
# model name
<NL_PRODUCT> → <N><L> <SSP>{3};
# integer
<INTEGER> → <SYM>{0,1}<ABS_INTEGER>;
<ABS_INTEGER> → <SSP> {1,};
# fraction
<FRACTION> → <INTEGER><SYM_FRACTION><INTEGER>;
<SYM_FRACTION> → <SLASH>;
# date
<DATE> → <MONTH-DAY><YEAR_SEG>{0,1};
<YEAR_SEG> → <SYM_DATE><YEAR>;
<YEAR> → <SSP>{2};
<MONTH_DAY> → <MONTH><SYM_DATE><DAY>;
<MONTH> → <SSP>{1,2}[QUA(<MONTH>)=={1,12}];
<DAY> → <SSP>{1,2}[QUA(<DAY>)=={1,31}];
<SYM_DATE> → <SLASH>;
# non terminal symbol
<SSP> → "0"|"1"|"2"|"3"|"4"|"5"|"6"|"7"|"8"|"9"|;
<SLASH> → "/";
<DOT> → ".";
<CDOT> → "·";
<Z> → "z"|"Z";
<N> → "N";
<L> → "L";
<SYM> → "+"|"-";
```

FIG. 7 p → p+m →

The application filed on 3/4/97 will be allowed 3 (numeral: integer)
3/4 (numeral: fraction)
3/4/97 (numeral: date)

← m →

C COMPANY PUTS NATURAL LANGUAGE PROCESSING SOFT NL 505 ON SALE

NL505 (NOUN : MODEL NAME)

ACCEPTED AS NON TERMINAL SYMBOL OF <NL_PRODUCT>

C COMPANY PUTS NATURAL LANGUAGE PROCESSING SOFT NL 510 ON SALE

NL510 (NOUN : MODEL NAME)

ACCEPTED AS NON TERMINAL SYMBOL OF <NL_PRODUCT>

[ Zzzzzz ] ... SLEEPING SOUND WAS HEARD

Zzzzzz (ADVERB : ONOMATOPOEIA)

ACCEPTED AS NON TERMINAL SYMBOL OF <SLEEPING SOUND>

[ zzzzz ] ... SLEEPING SOUND WAS HEARD zzzzz (ADVERB : MIMETIC WORD)

ACCEPTED AS NON TERMINAL SYMBOL OF <SLEEPING SOUND>

FIG. 8

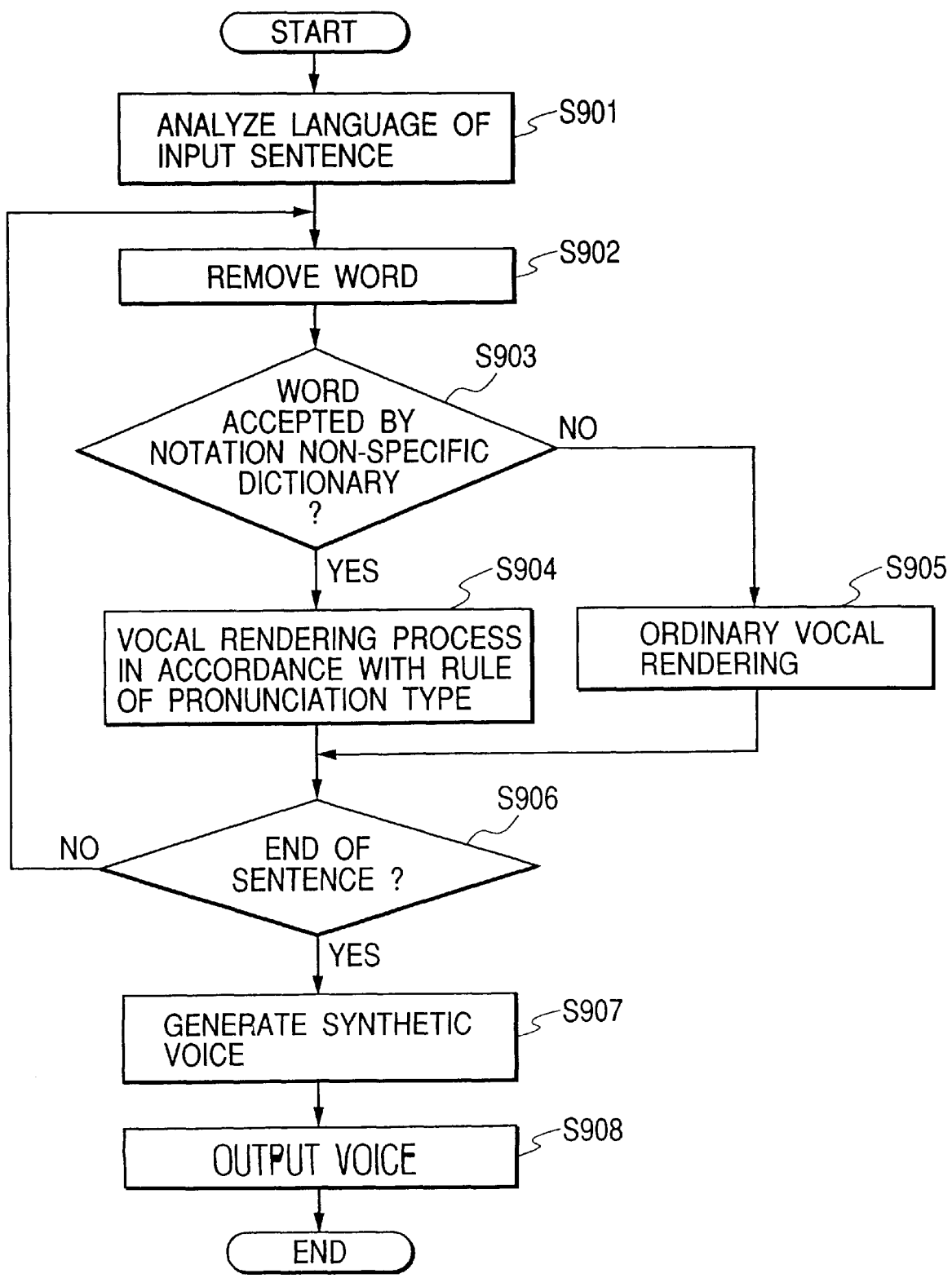

NATURAL LANGUAGE PROCESSING APPARATUS AND METHOD FOR CONVERTING WORD NOTATION GRAMMAR DESCRIPTION DATA

BACKGROUND OF THE INVENTION

1. Field of the Invention

The present invention relates to a natural language processing apparatus and a method for analyzing a natural language sentence using a dictionary and grammar data.

2. Related Background Art

For an analysis of a document written in a natural language, the definitions and properties of the individual words in a sentence are specified by referring to a dictionary. However, in a natural language sentence, various words appear for which a dictionary can provide no specific descriptions. For example, since new models of a product are produced sequentially, the names of all those models can not be specifically registered in a dictionary.

Further, with reference to onomatopoeic or mimetic words, the "z", as in "zzzzz", that can be used in English to represent the breathing sound produced by a sleeper, can be repeated an arbitrary number of times, so that in addition to "zzzzz", we could also have "zzzzzzzzz". And thus, since for such an expression an infinite number of descriptive variations can be produced, the registration in a dictionary of all the notations for the expression is neither feasible nor possible.

Furthermore, in a natural language sentence numerical expressions such as the following may appear: "1093", "5,000,000", "7.5", "½", "10-20", "2, 3", "5–3=2", "1997. 06. 25", "Jun. 25, 1997", "10:31", "03-3123-4567", and "2:3".

In consonance with the forms used for the expressions, these numerals represent the following: "integers", a "decimal fraction", a "fraction", "round numbers", an "equation", "dates", a "time", a "number", and a "ratio".

For example, "5,000,000" represents an integer while "Jun. 26, 1997" represents a date, and when analyzing a natural language, numerical expressions such as these must be extracted from sentences and the meanings ascribed to them must be adequately identified.

Assume, for instance, that in a sentence which is to be analyzed for voice synthesization the expression "Jun. 25, 1997" appears. If this entry were merely to comprise numerals and symbols that were to be sequentially read, the resultant pronunciation product would correspond to the string of words "six slash two five slash nine seven". However, were this numerical expression to be identified as an entry that represented a "date", it would correctly be read as "Jun. twenty-fifth, ninety-seven".

Consider as another example the information extraction technique. According to this technique, elements describing who, when, what, where and how are extracted from a sentence and are expressed in the form of a table. The focus of this technique is the provision of a means by which a user can be protected from being inundated by a flood of information produced by recent computer networking developments. If, as part of the pre-processing provided for information extraction, numerals can be correctly identified during the analyzation of a natural language sentence, a date, important as information that is used to establish the "when" of an occurrence, can be correctly extracted.

For many of the above words a specific rule is used for the construction of the expressions in which they are employed. Thus, assuming that the product models are NL550, NL560, . . . , it can be ascertained that the models of the products in this series are named using the pattern "NL<number>".

Further, numerical expressions are not formed merely by arranging numerals and symbols, and there are rules that govern the interpretation of the contents of expressions. In a fraction, for example, normally two numbers are juxtaposed with an intervening "/" symbol, since ordinarily not more than two strings of numerals are used with an intervening "/", and in addition, in a fraction a number before or after a "/" usually does not begin with a "0". However, in a date expression that employs the same "/" symbol, three numbers may be included, as in "Nov. 05, 1997", and a number that is set off by a "/" may begin with a "0".

Furthermore, the rules governing numerical expressions depend not only on the order of the numbers and symbols, but also on the relationships of the quantities represented by the numbers. For example, when expressing round numbers, such as "2, 3", the quantity that is represented by the numeral preceding the "," must be smaller by "1" than the quantity that is represented by the succeeding numeral.

In order to correctly analyze words for which, in consonance with specific rules, an infinite number of descriptive variations can be produced, ideally the rules that are used should themselves be adequately described; but since in actuality complete descriptions are not available for all such rules, a system is required that can provide for the flexible addition, deletion, or correction of rules.

SUMMARY OF THE INVENTION

It is, therefore, one objective of the present invention to provide a natural language processing apparatus and method for flexibly describing rules governing the use of such expressions as numerals, onomatopoeic words or the names of models, and for, in consonance with such rules, extracting the referenced expressions from sentences and correctly identifying the meanings that are represented by the expressions.

It is another objective of the present invention to provide a natural language processing apparatus an d method that can produce correct vocal reproductions of sentences which include such expressions as numerals, onomatopoeic words and serial numbers.

According to one aspect, the present invention, which achieves these objectives, is related to a natural language processing apparatus comprising:

grammar description data storage means for storing word notation grammar description data that describe construction rules for character strings composed of words belonging to a specific category; and analysis means for, based on the word notation grammar description data, extracting as a word, from a natural language sentence that is input, a character string that satisfies the construction rules, and for analyzing the natural language sentence.

According to another aspect, the present invention, which achieves these objectives, relates to a natural language processing method comprising the steps of:

entering a natural language sentence;

extracting as a word from the natural language sentence, based on word notation grammar description data that describe character string construction rules for words that belong to a specific category, a character string that satisfies the construction rules, and analyzing the natural language sentence; and outputting the result of the analysis.

According to still another aspect, the present invention that achieves these objectives relates to a computer-readable storage medium on which is stored a program for controlling a computer that performs natural language processing, the program comprising codes for causing the computer to perform the steps of:

entering a natural language sentence;

extracting as a word from the natural language sentence, based on word notation grammar description data that describe construction rules for words that belong to a specific category, a character string that satisfies the construction rules, and analyzing the natural language sentence; and outputting the result of the analysis.

During the course of the following description of a preferred embodiment of the invention, other objectives and advantages, in addition to those discussed above, will become apparent to those skilled in the art. In the description, reference is made to accompanying drawings that form a part of the description and that illustrate an example of the invention.

BRIEF DESCRIPTION OF THE DRAWINGS

FIG. 4 is a diagram showing an example notation non-specific dictionary;

FIG. 5 is a diagram showing example word notation grammar description data;

FIG. 7 is a diagram showing an example for extracting a numerical expression;

FIG. 8 is a diagram showing an example where words are extracted from a sentence that is input; and FIG. 9 is a flowchart showing the voice output processing.

DETAILED DESCRIPTION OF THE PREFERRED EMBODIMENT

The preferred embodiment of the present invention will now be described while referring to the accompanying drawings.

Figure 1:
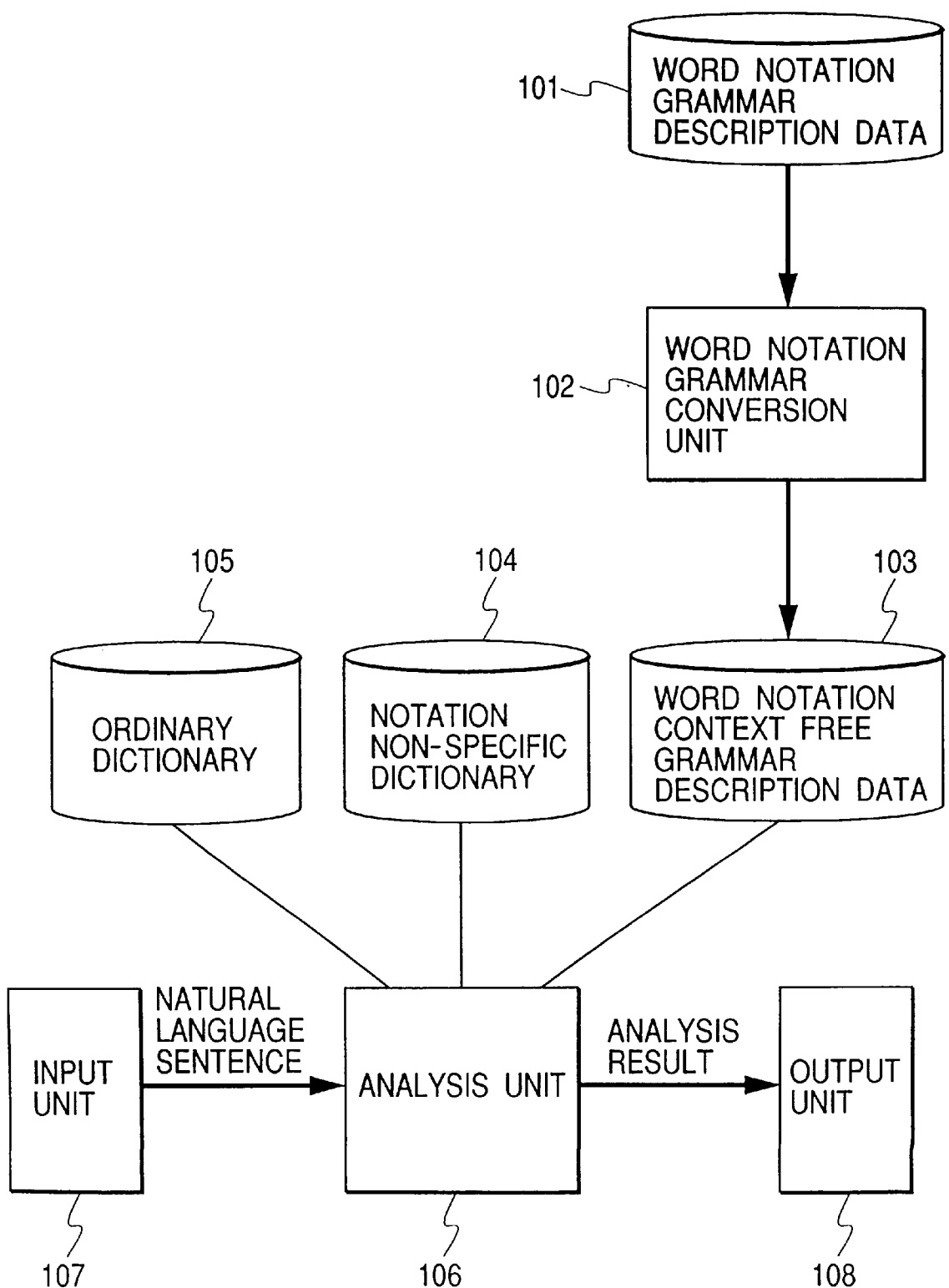
FIG. 1 is a diagram showing the functional arrangement of a natural language processing apparatus according to one embodiment of the present invention.

FIG. 1 is a functional block diagram illustrating the arrangement of a natural language processing apparatus according to one embodiment of the present invention. In FIG. 1 word notation grammar description data 101 are converted into word notation context free grammar description data 103 by a word notation grammar conversion unit 102. An analysis unit 106 refers to the word notation context free grammar description data 103, a notation non-specific dictionary 104 and an ordinary dictionary 105 for analyzing a natural language sentence that is received from an input unit 107, and outputs the result of the analysis to an output unit 108.

Figures 2, 3:
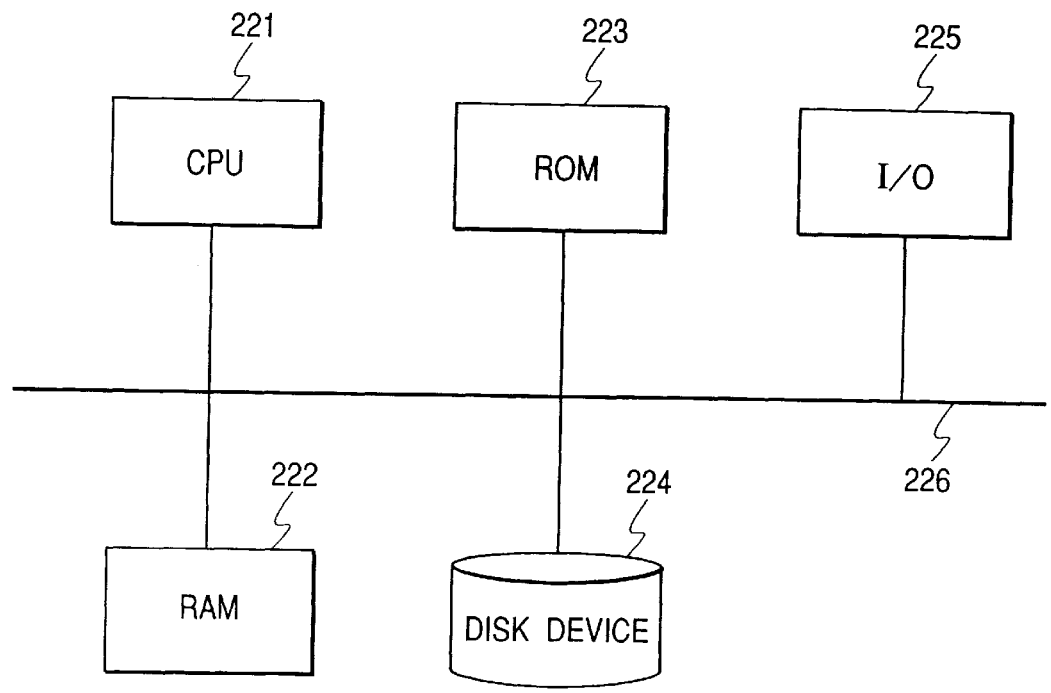
FIG. 2 is a diagram showing the hardware arrangement of a natural language processing apparatus according to the embodiment of the present invention.
FIG. 3 is a diagram showing an example ordinary dictionary.

FIG. 2 is a diagram showing the hardware arrangement according to this embodiment. A CPU 221 executes a program for implementing the processing that will be described later. A RAM 222 provides a storage area required for the execution of the program. A ROM 223 is used to store a program for the performance of the processing that will be described later. A disk device 224 includes areas in which the word notation grammar description data 101 and the word notation context free grammar description data 103 are stored, and that are used as the ordinary dictionary 105 and the notation non-specific dictionary 104. An I/O interface 225 is connected to a device that corresponds to the input unit 107 and the output unit 108. The input unit 107 may be, for example, a keyboard, an OCR, a receiver, or a memory in which documents are stored. The output unit 108 may be a loudspeaker, a display device, or a transmitter. A bus 226 connects the individual sections.

A dictionary and grammar that are employed for this embodiment will now be described. First, the ordinary dictionary 105 is generally used for the analysis of a natural language, and includes the contents shown in FIG. 3. In the ordinary dictionary 105, the notations for the individual words are specified, and if a variation of the notation exists, all the patterns are specifically described (see "notation" and "variant notation" in FIG. 3). On the other hand, as is shown in FIG. 4, in the notation non-specific dictionary 104 the notations for the individual words are not specifically described, and an abstract symbol, such as <INTEGER>, that represents a category is used as the value of a notation. This symbol is a non-terminal symbol that is defined using declared rules in the word notation grammar description data 101 shown in FIG. 5. In the word notation grammar description data 101, the delimiting symbols <> are used to set off a non-terminal symbol, and the rule is described as being a declaration that "the non-terminal symbol on the left consists of the elements shown to right". For example,

<DATE>→<MONTH-DAY> <YEAR_SEG>{0, 1};

means that <DATE> (corresponds to a numerical expression that represents a date in accordance with the notation non-specific dictionary 104 in FIG. 4) consists of <YEAR_SEG>{0, 1} (portion representing a year) and <MONTH-DAY> (portion representing a month and a day). Herein {m, n} indicates that the number of repetitions is equal to or more than m times and equal to or less than n times. Further, in the example

<MONTH>→<SS>{1, 2}[QUA(<MONTH>)=={1, 12}];

"[QUA(<MONTH>)=={1, 12}];" is a condition that establishes the rule. This example indicates that the quantity that is represented by a numerical string that corresponds to the non-terminal symbol <MONTH> must be equal to or greater than 1 and equal to or smaller than 12.

As is described above, the word notation grammar description data 101 are so formed by adding convenient expressions used to represent the rules for word notation, such as repetitious expressions and category definitions, to generation rules that use a non-terminal symbols and terminal symbols, i.e., a so-called context free grammar. The repetitious expressions can then be changed into standard forms for a context free grammar by employing an adequate expression conversion process. Thus, the word notation grammar conversion unit 102 performs this conversion to generate the word notation context free grammar description data 103. In addition to the commonly known analysis process that involves the use of the ordinary dictionary 105, the analysis unit 106 performs an analysis process by referring to word notation context free grammar description data 103 and the notation non-specific dictionary 104.

An explanation will now be given, while referring to the flowchart in FIG. 6, for the analysis process performed by the analysis unit 106 while using the word notation context free grammar description data 103.

The analysis unit 106 is activated by extracting a character string that is acceptable according to the grammar described by the word notation context free grammar description data 103. Various methods, called parsing methods, are already available as algorithms for use for the performance of analyses in accordance with the context free grammar (see "Fundamentals of Analysis of Natural Language", Hozumi Tanaka, Sangyo Tosho). In this embodiment, the parsing algorithm called the LR method is employed for this analysis processing.

First, an LR table is prepared from the word notation context free grammar description data 103 (S601). By the performance of this pre-process, the analysis is initiated. One sentence is extracted as an input sentence from text (S602), and a "1" is set for a pointer p (S603). Character position n is set to p, and an adequate action is initiated while reference is made to the LR table by using as a terminal symbol the n-th character from the head of the input sentence (S604). In the same manner, n is incremented by one and the action is begun in accordance with the LR table while using the n-th character as a terminal symbol. This is the well known process that uses the LR method. It should be noted, however, that in this process when the n-th character is not a terminal symbol that is defined in the word notation context free grammar description data 103, the character is regarded as an end symbol. When the character string is accepted (when a character string is obtained that matches the word notation rules in the word notation context grammar description data 103), the string that is extended from character position p of the input sentence to character position n is extracted as a word (S605 and S606).

Further, a non-terminal symbol is examined with which the character string that has been accepted is assembled at the end of the parsing process. And an entry that has the non-terminal symbol as its notation value is searched for in the notation non-specific dictionary 104. The contents of the entry are referred to, so that the part of speech of the word that consists of the character string that has been accepted, and other information can be obtained (S607). When a plurality of words is obtained that includes the character string that has been accepted, the longest word is regarded as an optimal word that begins at character position p. In order to continue the analysis for the portion that follows this word, pointer p is incremented by a number that is equivalent to length m of the word (S608). In FIG. 7 is shown an example where three numerical expressions, integer "3", fraction "¾" and date "Mar. 4, 1997", are extracted from character position p of the input sentence. The longest string (length m) "Mar. 4, 1997" is selected as the optimal solution, and the pointer is shifted to position p+m.

If no numerical expression that matches a character string beginning at position p is found in the word notation context free grammar description data 103 (the character string is not accepted), pointer p is incremented by one (S609). A check is then performed to determine whether pointer p has reached the end of the sentence (S610). If pointer p has not reached the end of the sentence, program control returns to step S604 and parsing is performed at position p. When pointer p has reached the end of the sentence, a check is performed to determine whether the sentence that is currently being analyzed is the end of the text (S611). When the current sentence is not the end of the text, program control returns to step S602 to analyze the next sentence. When the current sentence is the end of the text, the processing is terminated. FIG. 8 is a diagram showing another example where words are extracted from an input sentence by referring to the word notation context free grammar description data 103.

Next, a voice synthesis process, performed in accordance with the embodiment, that employs an analysis effected for a natural language will be explained. The voice synthesis process can be implemented by performing an adequate vocal reading upon receiving the result of the analysis and by generating a waveform for a synthetic voice. The voice synthesis processing that uses an analysis effected for a natural language will now be described while referring to the flowchart in FIG. 9.

First, the language of an input sentence is analyzed using the method described in this embodiment (S901). Words that are cut off as the result of the analysis are removed (S902), and a check is performed to determine whether each of the remaining words is accepted by the notation non-specific dictionary 104 (S903). If a word is accepted, it is rendered vocally in accordance with the "pronunciation" information that is provided in the notation non-specific dictionary 104 (S904). If the word is not accepted, an ordinary vocal rendering is performed (S905).

Assume that the word "Mar. 4, 1997", which is extracted from the sentence that is input in FIG. 7, is vocally rendered in accordance with the results of an analysis. This word is accepted as a "date", and according to the notation non-specific dictionary 104 in FIG. 4, the "pronunciation" for a "date" is described as "date reading". In the vocal rendering process (S904), therefore, this word is rendered vocally in accordance with the date reading. For the date reading, first, the character string constituting the word is divided into discrete parts separated by "/" symbols, so that "March" is identified as a month, "4" as a day, and "1997" as a year. When rules are employed that call for the "March", the month, to be rendered as "March", and for the day to be rendered as an ordinal number, an adequate rendering of "Mar. fourth, ninety-seven" can be provided. In this embodiment, pronunciations that are consonant with categories are defined, and since, as a result of the language analysis, the word can be identified as numerals that represent a date, an adequate rendering can be provided.

An explanation will be given for another example where the notation non-specific dictionary 104 in FIG. 4 is also referred to for the vocal rendering of the product name "NL550". In this case, the definition for "pronunciation" is "Alphabet reading, reading figures in monotone". In accordance with this description, the alphabetic portion is read as an alphabet and the numeral portion is read in a monotone manner, so that the pronunciation "én él fáiv fáiv óu" is provided.

Hereinafter individual words are rendered vocally in this manner until the current word is the end of the sentence, and an adequate synthetic voice is generated (S907) and output (S908).

In this embodiment, the processing employing the LR method has been explained as a parsing algorithm that performs an analysis in accordance with the context free grammar. Another parsing algorithm may be used so long as it employs the context free grammar for an analysis.

Further, in this embodiment, the grammar for accepting several types of character strings for an adverb that represents an onomatopoeic word, and a noun and numerals that represent the name of a product model is shown in FIG. 5 as an example of the word notation grammar description data 101. The addition, deletion and correction of this grammar can be flexibly performed, so that a method for accepting various types of character strings and for adequately identifying them as words, and a notation non-specific dictionary can be prepared. In this embodiment, the rules for numerals that represent an "integer", a "fraction" and a "date" are described. However, in order to analyze numerals that represent a greater variety of contents, such as a "decimal fraction", a "round number", an "equation", a "date", the "time", a "ratio" and a "number", only the word notation grammar that includes the corresponding contents need be described.

In the above embodiment, when a plurality of words that begin at the same character position are extracted, the longest word is selected. However, all these words may be employed as candidates and the optimal word may be selected using a standard other than the length, such as a definition given for the usage, or a frequency.

In the above described embodiment, an English sentence is employed as an example input sentence. However, another language can be employed in accordance with the description provided for the grammar. The numerical expression is common throughout the world, with minor exceptions, such as the expression of a date, and the grammar that handles a notation variation for model names and onomatopoeic words can also be described. For example, while the pattern used in this embodiment for the example date follows the American style, it can be rearranged in the order day, month and year of the British style, or in the order year, month and day of the Japanese style.

Within the scope of the implementation of the functions in the above embodiment, the present invention can be applied for a system that is constituted by a plurality of apparatuses (e.g., a computer, an interface device and a display device), or for a single apparatus.

Further, the scope of the present invention includes a case wherein software program code for implementing the functions of the previous embodiment is supplied to a system or to an apparatus that is connected to a variety of devices, and the computer (or a CPU or an MPU) in the system or the apparatus can operate these devices in accordance with the program code. In this case, the program code read from the memory medium is used to implement the functions of the above described embodiment. The program code itself and the means for supplying the program code to the computer, i.e., the memory medium on which the program code is stored, constitute the present invention.

A memory medium for supplying such program code can be, for example, a floppy disk, a hard disk, an optical disk, a magneto optical disk, a CD-ROM, a CD-R, a magnetic tape, a nonvolatile memory card, or a ROM.

In addition, the scope of the present invention includes program code not only for a case wherein the functions of the previous embodiment can be implemented when the program code is read and executed by the computer, but also for a case wherein, in accordance with an instruction included in the program code, the functions of the above embodiment are implemented in cooperation with an OS (Operating System) that is running on the computer, or with another application.

Furthermore, the present invention includes a case wherein program code, read from a memory medium, is written into a memory that is mounted on a function expansion board that is inserted into a computer, or on a function expansion unit that is connected to a computer, and in consonance with program code instructions, a CPU mounted on the function expansion board, or on the function expansion unit, performs one part, or all of the actual processing in order to implement the functions included in the above described embodiment.

When the present invention is applied for a storage medium, the program code that corresponds to the previously explained flowcharts must be stored thereon.

Although the present invention has been described in its preferred form with a certain degree of particularity, many apparently widely different embodiments of the invention can be devised without departing from the spirit and the scope thereof. It is to be understood that the invention is not limited to the specific embodiments described herein, except as is defined in the appended claims.

What is claimed is:

1. A natural language processing apparatus comprising:
   grammar description data storage means for storing word notation grammar description data that describe construction rules for character strings which constitute words belonging to a specific category;
   notation non-specific dictionary in which is explained word information for a word group that belongs to the specific category that is used for a notation;
   analysis means for, based on the word notation grammar description data, extracting as a word, from an input natural language sentence, a character string that satisfies one of the construction rules, and for analyzing the extracted word with referring to word information that is explained in said notation non-specific dictionary by using as a notation a category that corresponds to the one of the construction rules.

2. A natural language processing apparatus according to claim 1, further comprising:
   word notation grammar conversion means for converting said word notation grammar description data into word notation context free grammar data that are represented in the form of an expanded context free grammar,
   wherein said analysis means refers to said word notation context free grammar data for performing an analysis based on context free grammar.

3. A natural language processing apparatus according to claim 1, wherein, when a plurality of character strings beginning at the same character position are extracted as different words, said analysis means selects, as a result of an analysis, a word having the longest character string.

4. A natural language processing apparatus according to claim 1, wherein a construction rule for a notation for a numeral is explained in said word notation grammar description data.

5. A natural language processing apparatus according to claim 4, wherein a range or a property of a numerical portion that is included in said notation for said numeral is explained in said construction rule.

6. A natural language processing apparatus according to claim 1, wherein a construction rule for a notation for an onomatopoeic or a mimetic word is explained in said word notation grammar description data.

7. A natural language processing apparatus according to claim 6, wherein a character in a standard notation that can be repeated is identified in said construction rule.

8. A natural language processing apparatus according to claim 1, wherein a construction rule for a notation for a product name is explained in a notation non-specific dictionary.

9. A natural language processing apparatus according to claim 8, wherein a fixed character string and a range for a variable value are explained in said construction rule.

10. A natural language processing apparatus according to claim 1, further comprising:
    voice output means for vocally rendering said natural language sentence that is input based on a result obtained by an analysis performed by said analysis means.

11. A natural language processing apparatus according to claim 1, further comprising:

voice output means for determining the pronunciation of said word that is extracted based on a rule for the pronunciation of notations that are written in said notation non-specific dictionary, and for vocally rendering said natural language sentence that is input.

12. A natural language processing method comprising the steps of:

inputting a natural language sentence;

extracting as a word from the input natural language sentence, based on word notation grammar description data that describe construction rules for character strings which constitute words that belong to a specific category, a character string that satisfies one of the construction rules;

referring to notation non-specific dictionary in which is explained word information for a word group that belongs to the specific category that is used for a notation and analyzing the extracted word based on word information that is explained in said notation non-specific dictionary by using as a notation a category that corresponds to the one of the construction rules; and outputting the result of the analysis.

13. A natural language processing method according to claim 12, wherein said word notation grammar description data are converted into word notation context free grammar data that are represented in the form of an expanded context free grammar; and wherein at said analysis step said word notation context free grammar data are referred to for performing an analysis based on context free grammar.

14. A natural language processing method according to claim 12, wherein, when a plurality of character strings beginning at the same character position are extracted as different words, at said analysis step, a word having the longest character string is selected as a result of an analysis.

15. A natural language processing method according to claim 12, further comprising:

a voice output step of vocally rendering said natural language sentence that is input based on a result obtained by an analysis performed at said analysis step.

16. A natural language processing method according to claim 12, wherein at said outputting step, determined is the pronunciation of said word that is extracted based on a rule for the pronunciation of notations that are written in a notation-specific dictionary.

17. A computer-readable storage medium on which is stored a program for controlling a computer that performs natural language processing, said program comprising codes for causing said computer to perform the steps of:

inputting a natural language sentence;

extracting as a word from the input natural language sentence, based on word notation grammar description data that describe construction rules for character strings which constitute words that belong to a specific category, a character string that satisfies one of the construction rules;

referring to notation non-specific dictionary in which is explained word information for a word group that belongs to the specific category that is used for a notation and analyzing the extracted word based on word information that is explained in said notation non-specific dictionary by using as a notation a category that corresponds to the one of the construction rules; and outputting the result of the analysis.

* * * * *

UNITED STATES PATENT AND TRADEMARK OFFICE
CERTIFICATE OF CORRECTION

PATENT NO. : 6,188,977 B1
DATED : February 13, 2001
INVENTOR(S) : Makoto Hirota

Page 1 of 2

It is certified that error appears in the above-identified patent and that said Letters Patent is hereby corrected as shown below:

Title page,
Item [56] References Cited: FOREIGN PATENT DOCUMENTS, "07021174" should read -- 7-021174 --.

Figure 6:
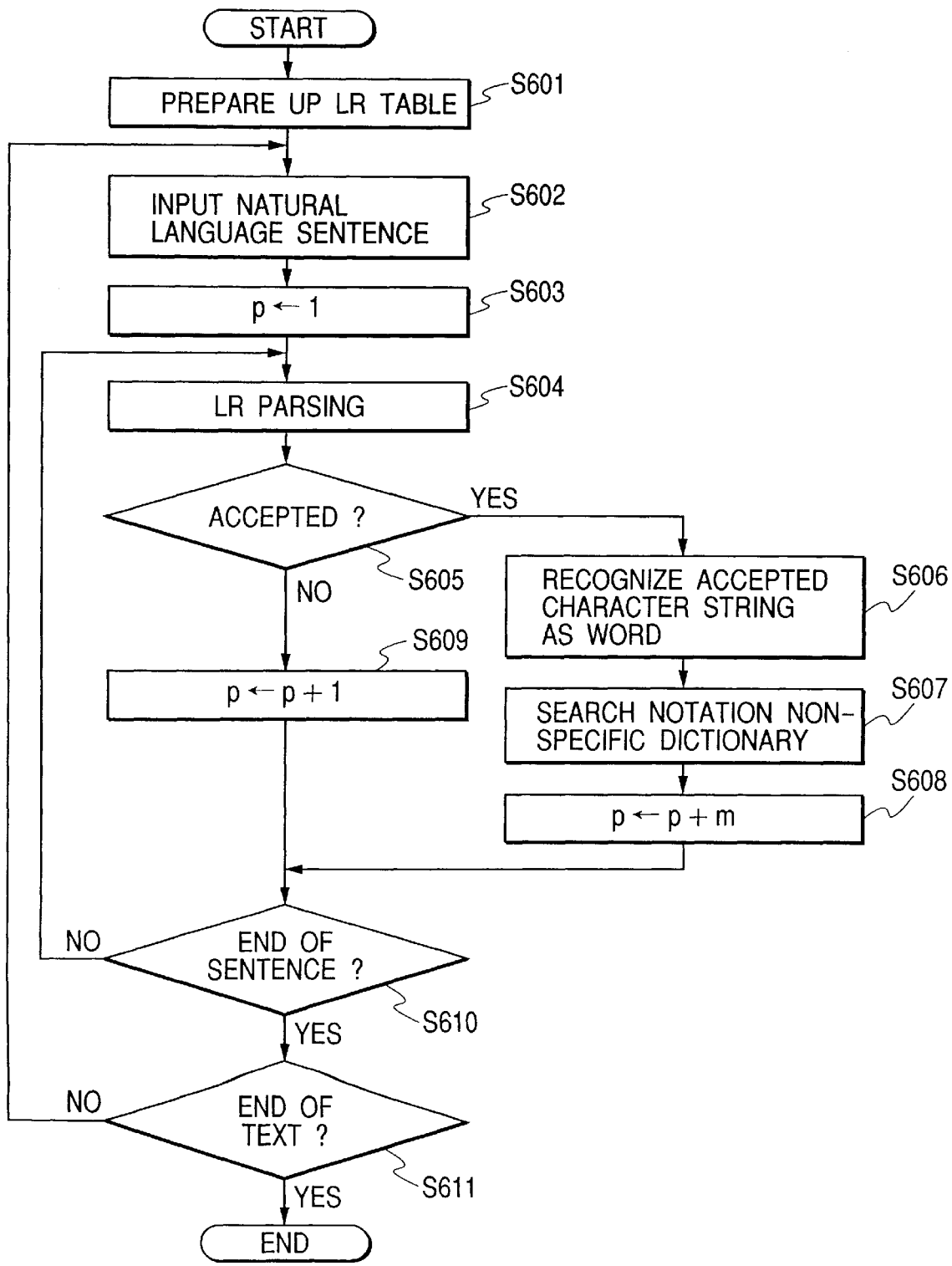
FIG. 6 is a flowchart showing the processing performed by an analysis unit.

Drawings, Sheet No. 5,
Figure 6, "UP" should be deleted.

Column 1,
Line 33, ""Jun. 25, 1997"," should read -- "6/25/97", --.
Line 40, ""Jun. 26, 1997"" should read -- "6/26/97" --.
Line 45, ""Jun. 25," should read -- "6/25/97" --.
Line 46, "1997"" should be deleted.
Line 52, "Jun." should read -- "June --.

Column 2,
Line 13, ""Nov. 05, 1997"," should read -- "11/05/97", --.
Line 40, "and d" should read -- and --.

Column 4,
Line 52, "a" should be deleted.

Column 5,
Lines 46 and 48, ""Mar. 4, 1997"," should read -- "3/4/97", --.

UNITED STATES PATENT AND TRADEMARK OFFICE
CERTIFICATE OF CORRECTION

PATENT NO. : 6,188,977 B1
DATED : February 13, 2001
INVENTOR(S) : Makoto Hirota

It is certified that error appears in the above-identified patent and that said Letters Patent is hereby corrected as shown below:

<u>Column 6,</u>
Line 20, ""Mar. 4, 1997","" should read -- "3/4/97", --.
Line 29, ""March"" should read -- "3" --.
Line 30, ""1997"" should read -- "97" --.
Line 31, ""March"," should read -- "3", --.
Line 34, ""Mar." should read -- "March --.

Signed and Sealed this

Twenty-ninth Day of January, 2002

Attest:

Attesting Officer

JAMES E. ROGAN
Director of the United States Patent and Trademark Office